United States Patent [19]

Booher

[11] Patent Number: 4,509,774
[45] Date of Patent: Apr. 9, 1985

[54] COMPOSITE CONTROL ARM APPARATUS

[76] Inventor: Benjamin V. Booher, 1721 Aldersgate, Leucadia, Calif. 92024

[21] Appl. No.: 525,011

[22] Filed: Aug. 22, 1983

[51] Int. Cl.³ .............................................. B16F 1/30
[52] U.S. Cl. .................................. 280/694; 280/669; 267/47
[58] Field of Search .............. 280/669, 694, 699, 719, 280/720; 267/41, 47, 149, 160, 151

[56] References Cited

U.S. PATENT DOCUMENTS

| | | | |
|---|---|---|---|
| 1,679,853 | 8/1928 | Cottin | 280/669 |
| 2,126,130 | 8/1938 | Nallinger | 280/694 |
| 2,157,773 | 5/1939 | Probst | 280/694 |
| 2,559,105 | 7/1951 | Banning, Jr. | 267/47 |
| 2,697,613 | 12/1954 | Giacosa | 280/719 |
| 3,034,802 | 5/1962 | Axtmann | 280/694 |
| 3,456,939 | 7/1969 | Duchemin | 267/47 |
| 3,698,702 | 10/1972 | Beck | 267/47 |

FOREIGN PATENT DOCUMENTS

| | | | |
|---|---|---|---|
| 954149 | 9/1974 | Canada | 267/47 |
| 2516455 | 5/1983 | France | 280/694 |

Primary Examiner—Richard A. Bertsch
Attorney, Agent, or Firm—H. Gordon Shields

[57] ABSTRACT

Composite control arm apparatus combines the functions of dimensional integrity and flexibility to replace a control arm and a spring in the suspension of an automotive vehicle. Different embodiments of composite control arm apparatus are shown, some of which include two materials bonded together, with one material providing primarily dimensional integrity and the other material providing primarily springiness or flexibility so that the two functions are combined in a single composite element.

7 Claims, 7 Drawing Figures

COMPOSITE CONTROL ARM APPARATUS

BACKGROUND OF THE INVENTION

1. Field of the invention

This invention relates to automotive vehicle suspensions and, more particularly, to a single control arm which takes the place of, or which replaces, a control arm and a spring in an automotive suspension.

2. Description of the Prior Art

Composite spring elements are relatively old in the art. Such spring elements usually are leaf springs which include metal elements and rubber elements usually bonded together. Examples of such elements are found in various patents. For example, U.S. Pat. No. 1,990,802 discloses a leaf spring for an automotive vehicle in which a plurality of metal leaves are combined with rubber elements. The rubber elements are disposed between the metal leaves.

U.S. Pat. No. 2,559,105 also discloses a composite metal and rubber leaf spring system.

U.S. Pat. No. 3,142,598 discloses another type of leaf spring which utilizes resin impregnated fiberglass.

U.S. Pat. No. 3,546,939 discloses a leaf spring system utilizing elastomeric material disposed between metal leaves of a spring.

U.S. Pat. No. 3,698,702 discloses a composite leaf spring formed of two superimposed spring leaves. One of the leaves is formed of metal, fiberglass, or the like, and the other leaf is made of an elastomeric material. The two leaves are bonded together.

It will be noted that in the above discussed patents, leaf springs are disclosed. The end use of the leaf springs is as a spring element in an automotive vehicle suspension. The prior art also discloses the use of leaf springs used in place of metal link type control arms. For example, in U.S. Pat. No. 1,679,853, a transversely mounted leaf spring is used as a spring element in the front end suspension of an automotive vehicle and also in the rear end suspension of an automotive vehicle.

U.S. Pat. No. 2,177,897 also discloses the use of a leaf spring system transversely mounted in an automotive vehicle suspension.

U.S. Pat. No. 2,697,613 also shows the use of transversely mounted leaf springs for an automotive vehicle suspension system.

None of the above-described patents discloses the use of a composite element which includes dimensional integrity and flexibility as part of a suspension system for automotive vehicles. The apparatus of the present invention includes both dimensional integrity and flexibility in a single element. In addition to replacing a control arm and a spring, the apparatus of the present invention also replaces the bushings require for the pivoting of prior art control arms.

SUMMARY OF THE INVENTION

The invention described and claimed herein comprises a composite control arm for an automotive vehicle including a single element having properties of dimensional integrity and flexibility or springiness to replace a control arm and a separate spring element in an automotive vehicle suspension.

Among the objects of the present invention are the following:

To provide new and useful control arm apparatus;

To provide new and useful control arm apparatus having a core and a laminate secured to the core;

To provide new and useful composite control arm apparatus;

To provide new and useful laminated control arm apparatus;

To provide new and useful composite laminated control arm appratus;

To provide new and useful automotive vehicle suspension apparatus in which a single control arm element replaces a control arm and a separate spring element; and To provide new and useful control arm apparatus including a composite element having a relatively dense core and a relatively less dense laminate.

DESCRIPTION OF THE PREFERRED EMBODIMENT

Figure 1:
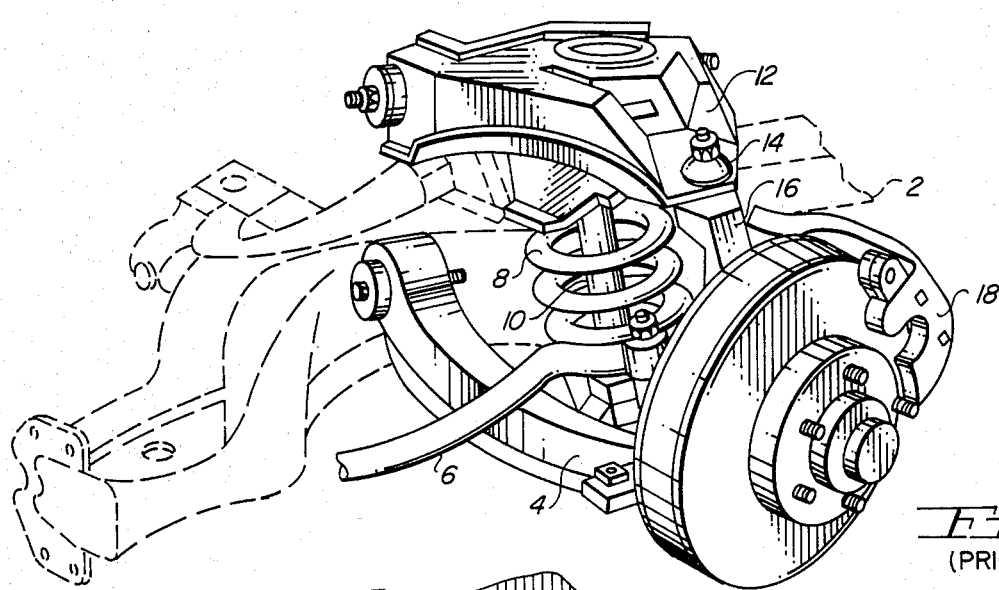
FIG. 1 is a perspective view of a front wheel suspension of the prior art.

FIG. 1 is a perspective view of a portion of a front suspension system of an automotive vehicle, illustrating the prior art. The prior art front suspension system includes an automotive vehicle frame 2 shown in dotted line, with various elements secured thereto. Among the elements secured to the frame 2 is a lower control arm 4 which is appropriately secured to the frame by a pivoting connection which allows the lower control arm, and the wheel, to move relative to the frame. A stabilizer link 6 is also shown extending from the front wheel assembly forwardly. Secured to the lower control arm 4, and extending upwardly toward the frame 2, is a coil spring 8. Disposed within the coil spring 8 is a shock absorber 10.

Also secured to a portion of the frame 2 for pivoting action is an upper control arm 12. The distal end of the upper control arm 12, remote from the frame 2, is secured to a steering knuckle 16 through an upper ball joint 14. The knuckle 16 is in turn secured to the front wheel hub, as in a disc brake assembly 18.

Figure 2:
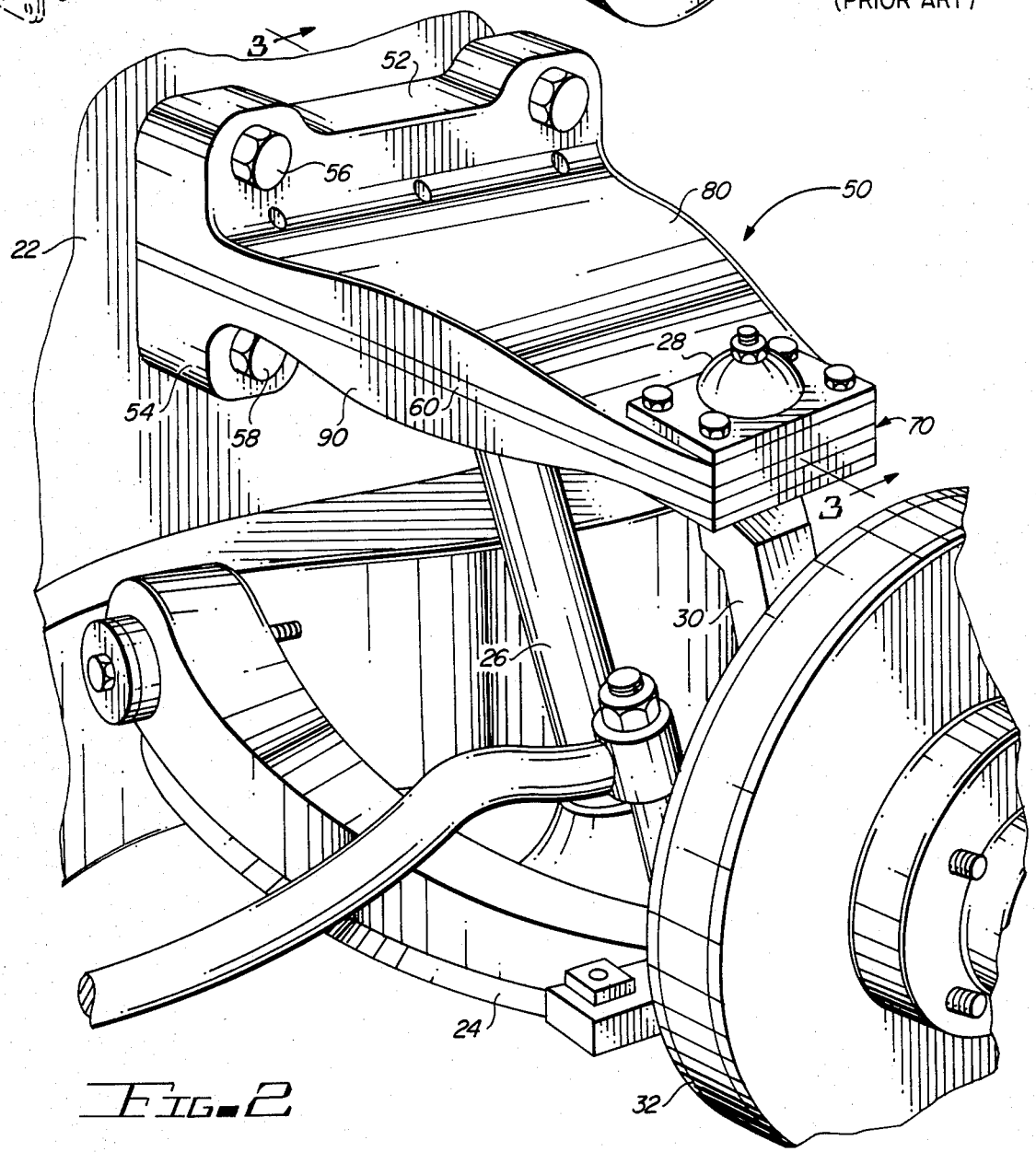
FIG. 2 is a perspective view illustrating the apparatus of the present invention in its use environment.

FIG. 2 is a perspective view of a portion of a front suspension system of an automotive vehicle illustrating the apparatus of the present invention. Some of the elements in FIG. 2 correspond to elements illustrated in FIG. 1. A portion of a frame 22 of an automotive vehicle is shown, with a lower control arm 24 pivotally secured thereto. A shock absorber 26 is secured at its lower end to the lower control arm 24 and is secured to the frame 22 at its upper end. A composite control arm 50 of the present invention is shown secured to the frame 22 at one end and to a ball joint 28 at its outer or distal end. The ball joint 28 is in turn secured to a steering knuckle 30. The steering knuckle is in turn secured to a front wheel hub. A disc brake assembly 32 is also secured to the front wheel hub.

The distal end of the lower control arm 24 is also secured to the front wheel hub through a lower ball joint 34. The wheel hub is thus suspended at the outer end of the lower control arm 24 and the composite control arm 50. The composite control arm 50 replaces the upper control arm 12 and the coil spring 8 of FIG. 1.

Figure 3:
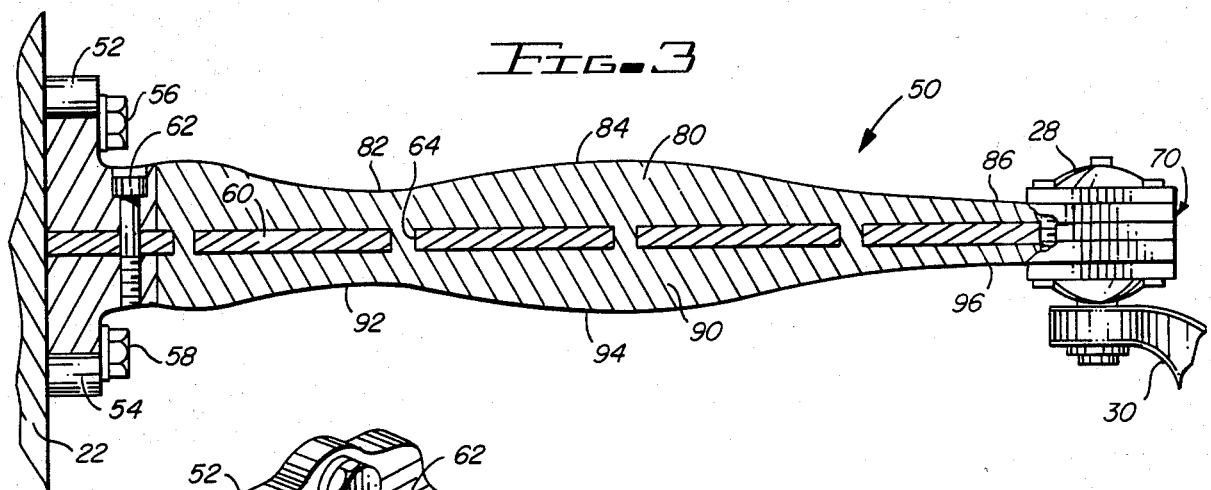
FIG. 3 is a view in partial section of the apparatus of the present invention taken generally along line 3—3 of FIG. 2.
Figure 4:
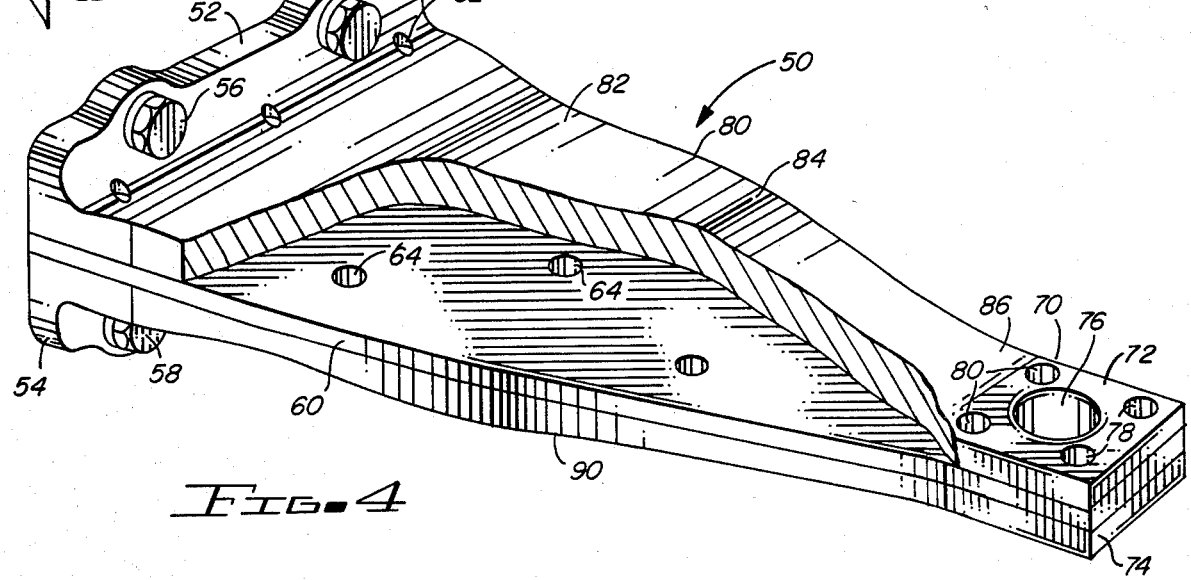
FIG. 4 is a perspective view, partially broken away, of an embodiment of the apparatus of the present invention.

FIG. 3 is a view in partial section of the composite control arm 50, taken generally along line 3—3 of FIG. 2. FIG. 4 is a perspective view of the composite control arm 50, with a portion broken away. For the following discussion, reference will primarily be made to FIGS. 2, 3, and 4.

The composite control arm 50 includes an upper base plate 52 and a lower base plate 54 which comprise one end, a first end, of the arm 50, and which are appropriately secured to the automotive frame 22, as by a plurality of upper bolts 56 and lower bolts 58. A core or first portion 60, which is preferably a relatively flat element or first layer of uniform thickness having the characteristic of dimensional integrity, is secured at the one end between the upper and lower base plate elements 52 and 54. Appropriate fastening elements, such as cap screws 62, may be used to secure the core 60 to the upper and lower base plates. The same fastening elements 62 are also used to secure the upper and lower base plates together.

At the distal end of the composite control arm apparatus 50, remote from the base plates 52 and 54, is an outer or second end 70. The outer end 70 is of constant thickness to facilitate the securing of the control arm apparatus 50 to the ball joint 28 and to the steering knuckle 30. The outer end 70 includes a generally flat upper surface 72 and a generally flat, planar bottom surface, parallel to the top surface 72. As shown in FIGS. 2, 3, and 4, there is a generally flat outer surface 74. Extending through the outer or sound end 70 is a plurality of apertures, including a central aperture 76 which receives the ball joint 28, or other appropriate elements for securing the composite control arm 50 to the steering knuckle 30, such as a sleeve, a bearing housing, or the like. In FIG. 2, and in FIG. 3, the upper ball joint 28 is shown secured to the outer end 70. In FIG. 4, the outer end 70 is shown without the upper ball joint 28.

Four bolt or rivet holes are shown spaced apart from the central aperture 76 and extending downwardly through the outer end from the top surface 72. Two of the holes 78 are outboard at the outer end 70, adjacent to the outer surface 74, and two of the holes or apertures 80 are shown inboard or inwardly from the other apertures 78 and the outer surface 74. The fastening elements which extend through the apertures 78 and 80 extend through the distal end of the core 60, and help to secure the core 60 to the outer end assembly 70, thus helping to insure the structure integrity of the composite control arm apparatus 50.

Disposed on the upper portion of the core 60 is an upper lamination or top or second layer 80. A mirror image of the upper lamination, a lower lamination or bottom layer 90, is disposed on the bottom of the core 60. The two laminations, the upper lamination 80 and the lower lamination 90, meet or blend together at the apertures 64 in the core 60. The upper and lower laminations 80 and 90, respectively, are virtual mirror images of each other with respect to the center or core 60.

As best shown in FIG. 3, the thickness of the upper and lower laminations is not uniform throughout the length of the composite control arm apparatus 50. Rather, the laminations include varying thicknesses. The thickness varies from the upper and lower base plates 52, 54, to the outer end assembly 70.

The thickness of the upper and lower laminations 80 and 90 is perhaps maximum at the area of the base plates 52, 54, and tapers to a transversely extending trough 82 in the upper lamination 80 and a transverse lower trough 92 in the lower lamination 90. The thickness then increases to a maximum mid-point thickness or transversely extending hump 84 on the top lamination 80 and a similar, mirror image hump 94 on the bottom lamination 90. From the midpoint thickness 84, 94, the laminations taper to a minimum at outer or distal ends 86 and 96 of the upper and lower laminations 80 and 90, respectively. The outer and lower laminations, outer ends 86, 96, respectively, terminate at the outer surface 74 at the outer end 70.

The purpose for the varying thickness of the upper and lower laminations is to provide for and define the flexibility of the composite control arm 50 and the areas of minimum and maximum flexure, and the like. For example, at the area of minimum thickness of the upper and lower laminations, flexibility will be maximum. At the area of maximum thickness of the laminations, flexibility will be minimum. Flexibility thus varies according to lamination thickness.

While the core material or first portion 60 includes the qualities or the characteristics of dimensional integrity, it is the upper and lower laminations 80 and 90 comprise a second portion that provide the flexing and springy quality or characteristics for the composite control arm apparatus 50. Thus, dimensional integrity of the arm 50 is maintained primarily by the core material 60, while the flexibility or springy characteristics are provided by the upper and lower laminations. Obviously, in the area of maximum lamination thickness, such as at the inner end of the control arm apparatus, adjacent to the upper and lower base plates 52 and 54, respectively, the flexing of the control arm apparatus 60 is minimum. However, at the outer or distal ends of the upper and lower laminations 86 and 96, respectively, flexing may be at a maximum, with less flexing occurring at the depressions 82 and 92.

The composite control arm apparatus 50 takes the place of both the upper control arm 12 and the coil spring 8, illustrated in FIG. 1. The qualities of dimensional control and flexibility are built into the composite control arm apparatus 50 to allow the control arm 50 to replace the structure and the functions of both the upper control arm 12 and the spring 8 of the prior art, as illustrated in FIG. 1.

In the embodiment shown in FIGS. 2, 3, and 4, the upper lamination 80 and the lower lamination 90 are preferably made of the same material. The core 60 is preferably made of material different from the material of the upper and lower laminations. For example, the core 60 may be made of material that is more dense than the material of which the upper and lower laminations 80 and 90, respectively, are fabricated. Since the primary purpose of the core material is to provide dimensional integrity, the density of the material may be substantially greater than the upper and lower laminations. The upper and lower laminations are appropriately bonded to the core material, and to each other, as through the apertures 64 in the core 60, to provide the necessary springy characteristics for the composite control arm 50. Thus, the upper and lower laminations 80, 90, in a sense replace the coil spring, while the core 60 replaces the upper control arm. The coil spring and the upper control arm are the corresponding prior art elements, as discussed in conjunction with FIG. 1.

In typical applications of contemporary technology, the core 60 may be made of a metal, while the upper and lower laminations may be made of an elastomeric material or the like. However, it is obvious that as technology changes, the relative density of the materials out of which a composite control arm may be made will vary. For example, for certain applications, the core may be made of stranded elements, such as fiberglass or carbon strands, secured together with an appropriate adhesive or resin, with the strands extending longitudinally between the base plates and the outer end assembly. The upper and lower laminations may be made of similar material, but with the strands extending transversely or substantially perpendicularly to the strands of the core material. This is shown in FIG. 5.

For certain applications it may not be necessary to have both an upper and a lower lamination. Thus, what is illustrated in FIGS. 2, 3, and 4 as a core may comprise either an upper or a lower lamination, the primary purpose of which is to provide dimensional integrity. A second lamination, the primary purpose of which is to provide the flexure capability, may be appropriately secured to the dimensional integrity layer either above it or below it. Accordingly, only two layers are needed. This is illustrated in FIG. 6.

Figure 5:
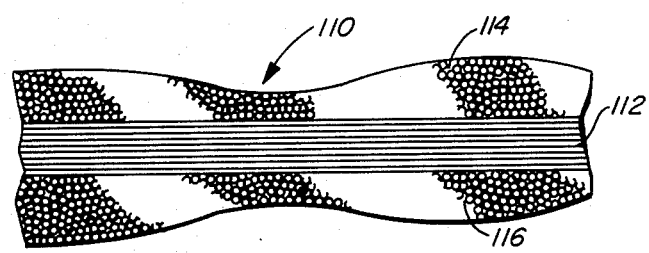
FIG. 5 is a view in partial section of a portion of an alternate embodiment of the apparatus of the present invention.

FIG. 5 is a schematic representation, in partial section, of a portion of an alternate embodiment of composite control arm apparatus 110. FIG. 5 shows the composite control arm apparatus 110 made of resin impregnated fibers extending longitudinally and transversely in three layers. The composite control arm apparatus 110 includes a core 112 in which the fibers extend longitudinally for dimensional integrity, and a pair of laminations disposed on opposite sides of the core 112. The laminations comprise an upper lamination 114 and a lower lamination 116. In both the upper lamination 114 and the lower lamination 116, the fibers are extending crosswise or transversely to the fibers in the core 112. The axis of the fibers in the core 112 and in the upper and lower laminations 114 and 116, respectively, are accordingly substantially perpendicular to each other.

Figure 6:
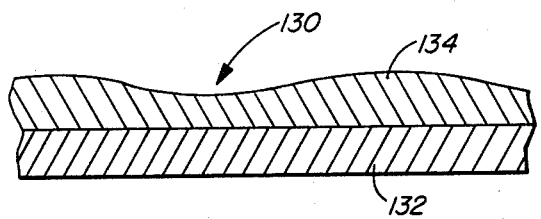
FIG. 6 is a view in partial section of a portion of another alternate embodiment of the apparatus of the present invention.

FIG. 6 is a view in partial section of an alternate embodiment of the apparatus of the present invention, comprising a two layer composite control arm apparatus 130. The control arm apparatus 130 includes a layer 132 of relatively uniform thickness. The purpose of the layer 132 is to provide dimensional integrity for the control arm apparatus 130. A single layer 134 is laminated to the uniform thickness layer 132. The thickness of the layer 134 varies, as discussed above in conjunction with the embodiments of FIGS. 2–4 and also as shown in FIG. 5. The purpose of the layer 134 is to provide for the flexibility or springiness of the composite control arm 130.

In all of the above discussion, it will be noted that the core layer, or one of the composite layers, is discussed as providing dimensional integrity. The other layer or layers is referred to as providing the flexing capability or springiness. As shown in FIGS. 2, 3, and 4, the flexing or springy layers vary in thickness. The core material, or dimensional integrity layer, is shown as being uniform in thickness throughout its length. While this may be preferable, it may not be necessary, depending on the materials actually used. However, for most applications, a uniform thickness for the dimensional integrity layer may be preferable. Whether or not the flexing or springy layer needs to vary in thickness perhaps depends most on the actual type of material used and the extent of its flexing capabilities.

Figure 7:
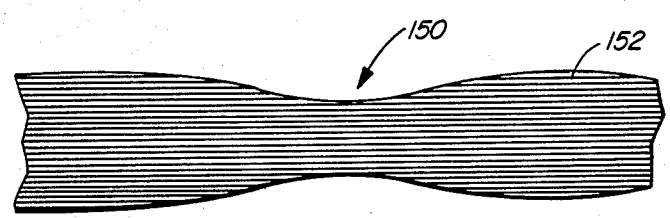
FIG. 7 is a view in partial section of a portion of another alternate embodiment of the apparatus of the present invention.

FIG. 7 is a view in partial section of an alternate embodiment of the apparatus of the present invention. The apparatus of FIG. 7 comprises a composite control arm 150 which is preferably made of resin impregnated material 152 in a single, continuous layer, or without layer differentiation. It has a varying outer (top and bottom) contour, similar to the apparatus of FIGS. 2–5.

The apparatus 150 of FIG. 7 varies from the apparatus 110 of FIG. 5 in that the apparatus 110 of FIG. 5 includes a central core having stranded material extending in transverse directions, with a center core or layer 112 extending in one dimension or direction and the upper and lower laminations 114 and 116 having their stranded material extending substantially perpendicularly to the core material 112. The strands in arm 150 preferably extend in one direction, all parallel to each other.

The control arm apparatus 150 of FIG. 7 is preferably molded of stranded material, such as fiberglass strands or carbon strands, or the like, impregnated with a resin. After curing, the resulting apparatus provides both flexing ability and dimensional integrity.

The stranded material 152 may include relatively long strands and relatively short strands, if so desired. The long strands may provide particularly advantageous characteristics for dimensional integrity, while the relatively short strands may enhance the flexing capabilities. However, the strands may also be uniform in length, if desired. Under some circumstances, random orientation of the fibers may produce satisfactory or desired properties. Obviously, the actual makeup of the strands and of the resin may vary as improvements and advancements in chemistry, particularly polymer chemistry, are made.

In keeping with the embodiments of FIGS. 2–6, the thickness of the composite control arm apparatus 150 may vary along the length between the inner or proximal end of the control arm (not shown), secured to a frame (not shown) and the distal or outer end (not shown) which is secured to appropriate mechanical elements associated with the front end suspension of the vehicle. In areas of maximum thickness, the flexing is maximum. The flexing between the minimum and maximum thickness areas varies, all as discussed above. The outer, contoured portions of the arm 150 thus determine the areas and extent of flexibility while the center portion of the arm 150 provides overall strength and dimensional integrity. If desired, the arm 150 may be configured with only one of its outer sides, either the top or the bottom, contoured, as opposed to both the top and the bottom sides being contoured, as shown in FIG. 7. The single contoured side concept is shown in FIG. 6. Similarly, the transversely layered composite arm 110 of FIG. 5 may also include only two layers, the core 112 and an outer, contoured layer, either layer 114 or 116.

In the embodiment of FIGS. 2-4, there are metal mountings secured to the control arm apparatus at both the inner and outer ends. For the embodiments of FIGS. 5 and 7, which are resin impregnated fiber or stranded arms, such end mountings may not be required. Rather, the ends may be appropriately machined after the resin has cured. Such is well known and understood in the art.

For the control arm apparatus 130 of FIG. 6, if one of the layers is metal, and the other layer is some other material, end mountings may be required. However, if both the dimensional integrity layer 132 and the flexure layer 134 are made of resin impregnated fiber or stranded material, then, as with the composite control arms 110 and 150 of FIGS. 5 and 7, respectively, the control arm apparatus 130 may not require separate end mountings, but rather the end mountings may simply be machined at the outer ends of the control arm apparatus from the cured, resin impregnated material.

It will be noted that the composite control arms 50 of FIGS. 2, 3, and 4 and also the control arms 110, 130, and 150 of FIGS. 5, 6, and 7, respectively, are shown relatively straight, lengthwise, which is their loaded or weighted positions. In their unloaded positions, the arms will include a slight convex curvature in the overall length of the arm. When loaded, or weighted, the arms would extend relatively straight, as shown in the drawings.

In FIGS. 2, 3, 4, 5, and 7, both the top and the bottom layers are contoured. In FIG. 6 only the top layer is contoured. However, all of the contours shown are substantially identical. This is for illustrative purposes only. The actual contouring may vary from application to application. Moreover, instead of a variable contour, as shown in FIGS. 2-5, a straight taper may be used, or a curve, or any combinations, depending on the material used, the particular use application, and other variables and desiderata.

The term "dimensional integrity" used herein refers to the concept of maintaining predetermined dimensions. That is, the composite control arms will not elongate or shrink under usage.

The flexing discussed refers to the arms flexing or moving vertically upwardly and downwardly in the vertical plane in response to various forces. However, the arms generally will not flex to any great extent in the horizontal plane forwardly or rearwardly. The outer or distal ends of the arms move relative to the inner or fixed ends of the arms vertically but not horizontally.

It will be noted that the composite arms of the present invention are fixedly secured to a frame member of a vehicle. In the prior art the control arms are pivotally secured to a frame member, and thus require some type of bushing for the relative movement. Since the composite control arms of the present invention flex instead of pivot, the requirement for bushings or other elements required for pivoting connections is obviated.

While the principles of the invention have been made clear in illustrative embodiments, there will be immediately obvious to those skilled in the art many modifications of structure, arrangements, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Control arm apparatus for a vehicle and adapted to be secured to the vehicle frame and to the vehicle wheel assembly, comprising, in combination:
   first end means adapted to be fixedly secured to the vehicle frame;
   second end means remote from the first end means and adapted to be secured to the vehicle wheel assembly and adapted to move vertically relative to the first end means;
   a first portion for providing dimensional integrity extending between and connected to the first and second end means; and
   a second portion connected to the first portion for providing flexibility extending between and connected to the first and second end means.

2. The apparatus of claim 1 in which the first portion of the arm means comprises a first layer extending between and secured to the first and second end means.

3. The apparatus of claim 2 in which the first layer is of substantially uniform thickness.

4. The apparatus of claim 2 in which the second portion of the arm means comprises a second layer secured to the first layer.

5. The apparatus of claim 4 in which the second layer is of variable thickness for determining the flexibility of the arm means between the first end means and the second end means.

6. The apparatus of claim 2 in which the second portion of the arm means includes a top layer of variable thickness and a bottom layer of variable thickness, and the top and bottom layers are both secured to the first layer.

7. The apparatus of claim 1 in which the first portion comprises a dimensionally uniform portion, and the second portion comprises a dimensionally non-uniform portion for determining the flexibility of the arm means between the first end means and the second end means.

* * * * *